Feb. 27, 1962  B. WEIL  3,022,903
TRANSFER MECHANISM FOR BREAD SLICES AND OTHER ITEMS
Filed Oct. 15, 1959  3 Sheets-Sheet 1

INVENTOR.
BERT WEIL
BY
ATTORNEYS

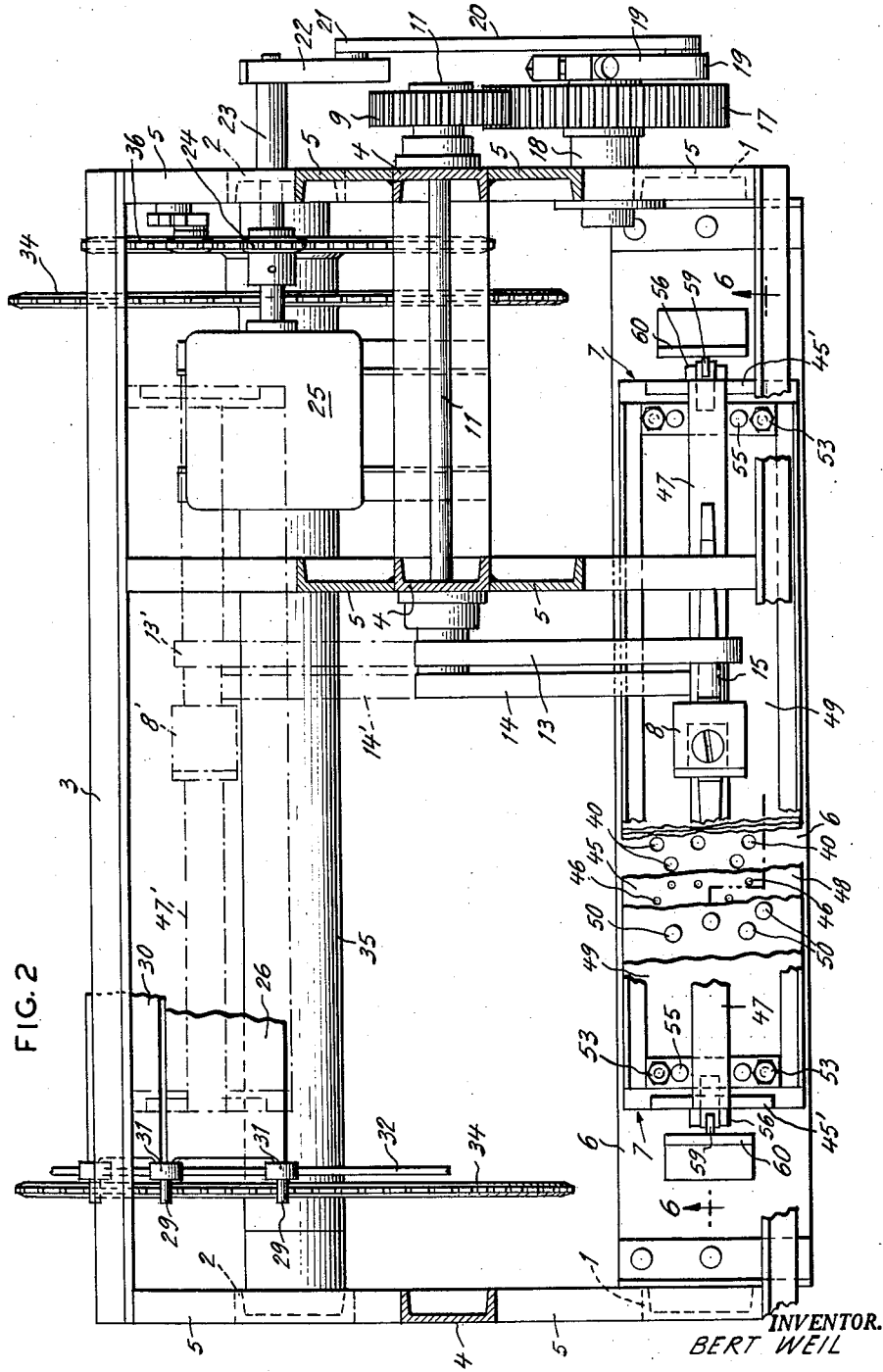

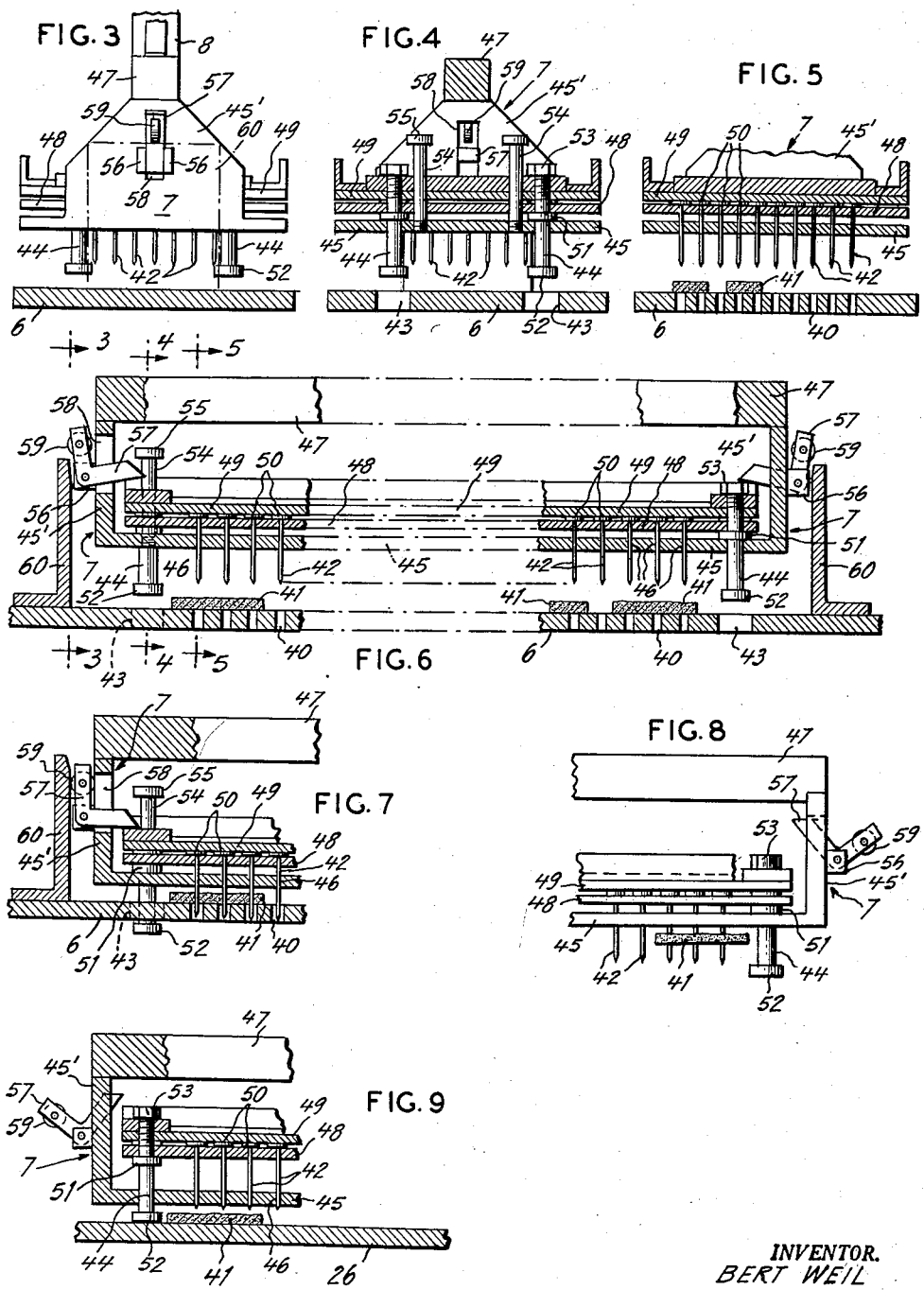

United States Patent Office 3,022,903
Patented Feb. 27, 1962

3,022,903
TRANSFER MECHANISM FOR BREAD
SLICES AND OTHER ITEMS
Bert Weil, New York, N.Y., assignor to Devonsheer
Melba Corporation, West New York, N.J., a corporation of New Jersey
Filed Oct. 15, 1959, Ser. No. 846,732
16 Claims. (Cl. 214—1)

The present invention is directed to an apparatus for transferring articles from place to place and more particularly it is directed to a mechanism which is intended for use in transferring slices of bread into a toasting oven.

In the commercial manufacture of toast, such as Melba toast, the ovens used in the operation are usually of a continuous type wherein the slices of bread travel on an endless belt from one end to the other during the toasting operation. It is customary to feed large numbers of slices into such ovens and up to the present time, the feeding has been accomplished by hand. Such feeding is quite slow and involves a high labor cost. Because of the slowness, the capacity of the ovens is limited although ordinarily they would be capable of higher production. In addition thereto, there is danger to the operator in the feeding into moving mechanisms.

The present invention is intended and adapted to overcome the difficulties and disadvantages inherent in prior operation of feeding of various articles, it being among the objects of the present invention to provide an apparatus which is fully automatic and which transfers bread slices from a feeding table into an oven without the necessity of manual handling.

It is also among the objects of the present invention to provide a mechanism for accomplishing the result, which is rapid in its action, which is reliable and which is sturdy in construction.

In practicing the present invention, there is provided a table on which a plurality of bread slices are placed and a pickup mechanism is provided to be lowered onto the table whereby the bread slices are attached to the pickup. Mechanism is also provided for swinging the pickup from the table to the entrance to an oven, being lowered to deposit the bread slices upon a plate which then travels through the oven. The cycle is repeated automatically.

The invention is more fully described in connection with the accompanying drawings constituting a part hereof and in which like reference characters indicate like parts, and in which—

FIG. 2 is a top plan view thereof taken along line 2—2 of FIG. 1, some parts being broken away for clearness;

FIG. 3 is a side elevational view of the transfer mechanism in a position approaching the bread holding table to pick up the slices, and taken along line 3—3 of FIG. 6;

FIG. 4 is a transverse cross-sectional view taken along line 4—4 of FIG. 6;

FIG. 5 is a transverse cross-sectional view taken along line 5—5 of FIG. 6;

FIG. 6 is a longitudinal cross-sectional view taken along line 6—6 of FIG. 2, showing the mechanism approaching the table;

FIG. 7 is a fragmentary view similar to FIG. 6, showing the piercing of the bread by the pins;

FIG. 8 is a fragmentary view showing the transfer mechanism carrying the bread on its way to the plate on which the bread is to be deposited, and FIG. 9 is a similar view showing the transfer mechanism just after having deposited the bread on the plate.

Figure 1:
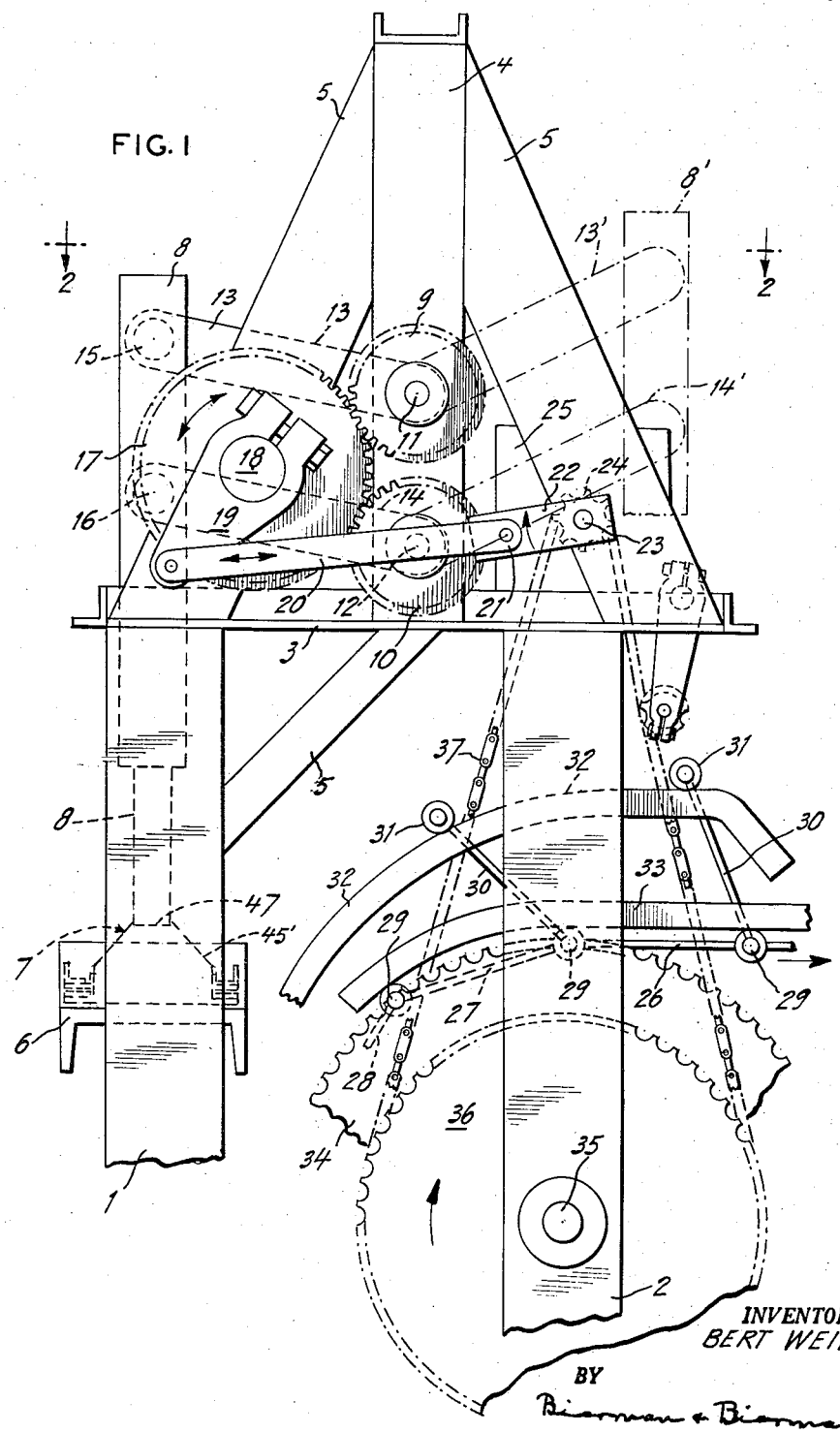
FIG. 1 is a side elevational view of a portion of an apparatus for feeding bread slices into an oven to be toasted, showing one embodiment of the transfer mechanism of the present invention.

The machine has a frame exemplified by columns 1 and 2, platform 3, post 4, and braces 5. A table 6 is adapted to hold articles such as bread slices, to be transferred and a pickup 7, having a support 8, is adapted to remove said bread slices from the table.

In order to control the movements of pickup 7, there are mounted on post 4 a pair of vertically spaced pinions 9 and 10 held on stub shafts 11 and 12, respectively. Links 13 and 14 have one end fixed to pinions 9 and 10, respectively, and the other end pivoted in parallel relation to support 8 by vertically spaced pins 15 and 16, respectively. Gear 17 on pivot 18 meshes with both pinions 9 and 10. Crank 19 is fixed to gear 17 and has at its free end one end of pitman 20 pivoted thereto. The other end 21 of pitman 20 is pivoted to the free end of arm 22 secured at its other end to stub 23 on which sprocket 24 is fixed. A motor, shown diagrammatically at 25, serves to rotate sprocket 24.

Referring to the lower part of FIG. 1, there is indicated the elements constituting the entrance to a toasting oven. Plate 26 is in position to receive bread slices, and it is linked to a series of similar plates, such as 27 and 28, in an endless chain formed by connecting pins 29 between the individual plates. Complementary plates 30 are adapted to cover the bread slices as they enter the oven. Rollers 31 at the ends of plates 30 run on track 32 whereby they are guided in the travel of the endless belt into and out of operative position. Similarly, track 33 guides plates 26 etc. Sprocket 34 has pockets to receive pins 29 to propel the chain, and is secured to stub shaft 35 which also carries sprocket 36 connected by chain 37 to sprocket 24, whereby the movement of plates 26 etc. is synchronized with that of pickup 7.

The specific construction of table 6 and pickup 7 is more fully shown in FIGS. 3 to 9. Table 6 has a plurality of perforations or openings 40 so that bread slices 41 placed on the table will cover at least some of said openings. Pins 42 on pickup 7 are adapted to pierce slices 41 and enter openings 40. At the corners of rectangular table 6 are large openings 43 adapted to loosely receive stripper studs 44 movably mounted in lower face 45 of the pickup. Openings 46 in face 45 are in alinement with openings 40. Face 45 has upstanding sides 45' and a top 47, thereby forming a box-like structure. Within the box is a carrier plate 48 having a cover 49 attached thereto, the heads 50 of pins 42 being held between carrier 48 and cover 49. A shoulder or collar 51 on studs 44 is adapted to contact the under side of face 45, and head 52 is provided on the lower end. The upper end of said studs is threaded into cover 49 and held by nut 53. Bolts 54 have the lower ends threaded into face 45 and heads 55 of said bolts serve to limit the upward travel of said face and associated elements by contact with top 47.

As shown particularly in FIG. 6, means for holding pins 42 in position to pierce slices 41 include one or more brackets 56 on which is mounted bell-crank 57, one arm of which operates in slot 58 and is adapted to contact the top of cover 49. Roller 59 mounted in the other arm of bell-crank 57 is adapted to cooperate with projection 60 on table 6.

The operation of the apparatus is as follows:

Referring more particularly to FIGS. 3 to 9, inclusive, a plurality of bread slices 41 are arranged on table 6 and pickup 7 is moved by the action of motor 25, arm 22, link 20, crank 19, gear 17 and pinions 9 and 10 so that it descends upon plate 6. Pins 42 pierce the bread slices and enter openings 40. At the same time, studs 44 enter into openings 43 so that they are inoperative. As pickup 7 descends, roller 59 of bell crank 57 contacts projection 60 whereby the bell crank is forced inwardly onto cover 49 of carrier 48, holding it in position to force pins 43 to pierce the bread slices.

As rotation of arm 22 passes the neutral point, it draws link 20 to the right as shown in FIG. 1, oscillating crank 19 and causing reverse movement of gear 17 and pinions 9 and 10. This raises pickup 7 in a convex arc, so that links 13 and 14 now take the positions shown at 13' and 14'. The movement continues with pickup 7 coming into contact with plate 26 as shown in FIG. 9. Since plate 26 does not have any perforations, stud 44 which is secured to carrier 48 forces said carrier upwardly as shown in FIG. 9, thereby raising pins 42 and releasing the bread slices. Bell crank 57 being free to move, does not interfere with the holding action of studs 44. In order to prevent too great a lifting of carrier 48, heads 55 of bolts 54 contact top 47 of the carrier arrangement and prevent pins 42 from being lifted out of openings 46.

As the apparatus continues to operate, pickup 7 is returned to table 6 and the cycle is repeated.

While the invention has been described in connection with the making of Melba toast, the invention is not limited thereto, nor even to the transfer of articles to an oven. The apparatus is useful also for transferring non-edible products from one place to another, provided that the pins are adapted to pick them up without serious injury thereto. For instance, wads of cotton may be shifted from the point of production to the packaging machinery. These and other uses are possible with the present apparatus, and the invention is to be broadly construed and to be limited only by the claims appended hereto.

I claim:

1. Apparatus for transferring articles from place to place comprising a frame, a table in the lower part of said frame, a horizontally movable plate spaced from said table in about the same horizontal plane and onto which said articles are adapted to be transferred, a pickup above said table, an upstanding support secured to said pickup, a vertical post above and between said table and plate, said post fixed to said frame, a pair of parallel links the corresponding ends of which are pivoted to said post and support respectively, said corresponding ends being in substantially vertical alinement, at least one pinion fixed on the post end of at least one of said links and on the pivot thereof, means connected to said pinion for oscillating the same, whereby said pickup is raised from said table and shifted laterally and lowered to said plate and vice versa.

2. Apparatus according to claim 1 characterized in that a pinion is provided at the post end of each of said links and said oscillating means is connected to both of said pinions.

3. Apparatus according to claim 1 characterized in that said oscillating means includes a gear meshing with said pinion, a crank on said gear and means for actuating said crank.

4. Apparatus according to claim 1 characterized in that there is provided means for moving said plate, said moving means connected to said oscillating means, whereby the movements of said pickup and plate are synchronized.

5. Apparatus according to claim 1 characterized in that said table has a plurality of perforations, said articles adapted to lie upon said table, said pickup having depending pins adapted to pierce said articles, said pins being in alinement with said perforations and being adapted to pass through said articles and to enter said perforations.

6. In an apparatus for the pickup and transfer of articles from a table to a plate, the improvement which comprises a pickup having a carrier, depending pins in said carrier, a lower pickup face having holes through which said pins pass, said table having perforations through which said pins are adapted to pass, at least one stripper stud fixed on said carrier and movable through said pickup face, said table having an opening through which said stud is adapted to freely pass.

7. An apparatus according to claim 6 characterized in that said carrier has a cover, said pins having heads contacting said carrier, said cover contacting said heads, said carrier and cover being secured together.

8. An apparatus according to claim 6 characterized in that said pickup face has upstanding sides and a top, and a support secured to said top.

9. An apparatus according to claim 6 characterized in that a plurality of said studs are mounted at opposite sides of said pickup.

10. An apparatus according to claim 6 characterized in that said table has an upstanding cam face and said pickup has a lever adapted to contact said cam face and said carrier to bias said carrier toward said table.

11. An apparatus according to claim 6 characterized in that one of said table and pickup has an upstanding cam face and the other has a lever adapted to contact said cam face and said carrier to bias said carrier toward said table.

12. Apparatus according to claim 11 characterized in that said lever is a bell crank, one arm adapted to contact said cam and the other arm to contact said carrier.

13. Apparatus according to claim 10 characterized in that said pickup has a bracket adjacent said cam face and said lever is pivoted on said bracket.

14. An apparatus according to claim 6 characterized in that said plate is imperforate at a point below said stud.

15. Apparatus according to claim 6 in which a shoulder on said stud is adapted to contact the under side of said lower face.

16. Apparatus according to claim 6 in which said pickup is substantially rectangular and stripper studs mounted for relative vertical movement in the corners of said pickup.

References Cited in the file of this patent

UNITED STATES PATENTS

| | | |
|---|---|---|
| 815,608 | Mangin | Mar. 20, 1906 |
| 1,706,632 | Onstad | Mar. 26, 1929 |
| 1,963,036 | Trolley | June 12, 1934 |
| 1,990,370 | Caputo | Feb. 5, 1935 |
| 2,366,941 | Taylor | Jan. 9, 1945 |
| 2,431,265 | Madsen | Nov. 18, 1947 |
| 2,500,647 | Schulthess | Mar. 14, 1950 |
| 2,514,977 | Tatosian | July 11, 1950 |
| 2,578,912 | Waters | Dec. 18, 1951 |
| 2,834,605 | McCollough | May 13, 1958 |